US007533710B2

(12) United States Patent
Michalski et al.

(10) Patent No.: US 7,533,710 B2
(45) Date of Patent: May 19, 2009

(54) LINEAR STAMP APPLICATOR MACHINE AND METHOD OF OPERATING THE SAME

(75) Inventors: Ronald Michalski, Glendale Heights, IL (US); Michael J. Christensen, Parkers Prairie, MN (US); David A. Lindquist, Alexandria, MN (US); Kyle R. Gugisberg, Glenwood, MN (US)

(73) Assignee: Illinois Tool Works Inc., Glenview, IL (US)

(*) Notice: Subject to any disclaimer, the term of this patent is extended or adjusted under 35 U.S.C. 154(b) by 399 days.

(21) Appl. No.: 10/037,386

(22) Filed: Dec. 21, 2001

(65) Prior Publication Data

US 2003/0116285 A1 Jun. 26, 2003

(51) Int. Cl.

| | |
|---|---|
| ***B29C 65/48*** | (2006.01) |
| ***B32B 41/00*** | (2006.01) |
| ***B65B 19/28*** | (2006.01) |
| ***B65B 57/00*** | (2006.01) |

(52) U.S. Cl. ................. 156/556; 156/566; 156/DIG. 3; 156/DIG. 4; 156/DIG. 27; 156/DIG. 37; 53/52; 53/382.1; 53/383.1

(58) Field of Classification Search ..................... 53/52, 53/493, 504, 73, 382.1, 383.1, 75, 74; 156/64, 156/350, 351, 360, 367, 378, 443, 537, 538, 156/539–541, 556, 566, DIG. 3, DIG. 4, 156/DIG. 27, DIG. 37, 230, 234, 240, 289, 156/308.2, 387

See application file for complete search history.

(56) References Cited

U.S. PATENT DOCUMENTS

| | | | | | |
|---|---|---|---|---|---|
| 3,894,380 | A | * | 7/1975 | Paulsen | 53/75 |
| 4,101,362 | A | * | 7/1978 | Baker et al. | 156/235 |
| 4,265,355 | A | | 5/1981 | Davis | |
| 4,317,319 | A | * | 3/1982 | Price | 53/76 |
| 4,722,165 | A | * | 2/1988 | Marchetti | 53/76 |
| 5,168,883 | A | * | 12/1992 | Winn | 131/283 |
| 5,207,331 | A | * | 5/1993 | Teegarden et al. | 209/556 |
| 5,250,138 | A | * | 10/1993 | Szewczyk et al. | 156/350 |
| 5,657,855 | A | * | 8/1997 | Ferguson | 198/803.7 |

* cited by examiner

*Primary Examiner*—Philip Tucker
*Assistant Examiner*—Sing Chan
(74) *Attorney, Agent, or Firm*—Steven W. Weinrieb

(57) ABSTRACT

Apparatus for applying tax stamps to individual cigarette packages of different cigarette cartons, having different height dimensions, comprises a cigarette carton height determination station, a cigarette carton opening station, a cigarette package tax stamp application station, a cigarette carton closing station, and a cigarette carton exit station. Each particular cigarette carton has its height dimension determined at the first cigarette carton height determination station, and the height dimension data is transmitted to a programmable logic controller (PLC). The programmable logic controller (PLC) automatically adjusts mechanisms located at the various stations in accordance with the height dimension data characteristic of each cigarette carton.

16 Claims, 5 Drawing Sheets

LINEAR STAMP APPLICATOR MACHINE AND METHOD OF OPERATING THE SAME

FIELD OF THE INVENTION

The present invention relates generally to apparatus, machines, or systems for applying, for example, tax stamps to individual packages of cigarettes contained within a carton of cigarettes, and more particularly to a new and improved machine, apparatus, or system, and a method of operating the same, for applying tax stamps to individual packages of cigarettes contained within a carton of cigarettes wherein the machine, apparatus, or system is capable of automatically handling differently sized cartons of cigarettes, comprising different brands of cigarettes produced by different cigarette manufacturers, as a result of the mechanisms comprising the cigarette carton opening station, the cigarette package stamping station, and the cigarette carton closing station being automatically adjustable.

BACKGROUND OF THE INVENTION

Machines, apparatus, or systems for applying, for example, tax stamps to individual packages of cigarettes contained within a carton of cigarettes are known in the art. An example of one such machine, apparatus, or system is disclosed within U.S. Pat. No. 4,265,355 which issued to Davis on May 5, 1981. In accordance with the operative structure comprising the disclosed machine, apparatus, or system, cartons of cigarettes are transported or conveyed by means of an infeed conveyor to an input platform or table, and subsequently, the cartons of cigarettes are further conveyed, moved, or routed through a carton separating stage, a carton flap opening stage, a carton flap fold-back stage, a cigarette package stamping stage, and a carton flap reglueing stage. If cartons having different length, different width, and/or different height dimensions are to be processed, various structural components or mechanisms comprising the various aforenoted cigarette carton and package processing stages or stations must be adjusted so as to in fact enable the machine, apparatus, or system to accommodate and process the cartons having such different length, width, and height dimensions. Unfortunately, in accordance with the structural arrangement or construction comprising the various interactive or interoperative components of the aforenoted machine, apparatus, or system of Davis, the adjustable structural components or mechanisms must be manually adjusted which is very time-consuming and tedious for operator personnel. As can therefore be readily appreciated, the through-put processing speed of the machine, apparatus, or system is relatively slow, and the through-put processing or output volume of the machine, apparatus, or system is relatively low.

A need therefore exists in the art for a new and improved machine, apparatus, or system for applying tax stamps to individual packages of cigarettes contained within a carton of cigarettes wherein the various interactive or interoperative components of the machine, apparatus, or system which comprise, or are positioned at, for example, the carton flap opening station, the cigarette package stamping station, and the carton flap closing station, are able to be automatically adjusted “on-the-fly” or, in other words, while the various cigarette cartons are being conveyed along their processing path or route, such that the through-put processing speed of the machine, apparatus, or system is relatively fast, and the through-put processing or output volume of the machine, apparatus, or system is relatively high.

OBJECTS OF THE INVENTION

Accordingly, it is an object of the present invention to provide a new and improved machine, apparatus, or system, and a method of operating the same, for applying tax stamps to individual packages of cigarettes contained within a carton of cigarettes.

Another object of the present invention is to provide a new and improved machine, apparatus, or system, and a method of operating the same, for applying tax stamps to individual packages of cigarettes contained within a carton of cigarettes which effectively overcomes various operational drawbacks and disadvantages characteristic of PRIOR ART machines, apparatus, or systems for applying tax stamps to individual packages of cigarettes contained within a carton of cigarettes.

An additional object of the present invention is to provide a new and improved machine, apparatus, or system, and a method of operating the same, for applying tax stamps to individual packages of cigarettes contained within a carton of cigarettes wherein the various interactive or interoperative components of the machine, apparatus, or system which comprise, or are positioned at, for example, the carton flap opening station, the cigarette package stamping station, and the carton flap closing station, are able to be automatically adjusted.

A further object of the present invention is to provide a new and improved machine, apparatus, or system, and a method of operating the same, for applying tax stamps to individual packages of cigarettes contained within a carton of cigarettes wherein the various interactive or interoperative components of the machine, apparatus, or system which comprise, or are positioned at, for example, the carton flap opening station, the cigarette package stamping station, and the carton flap closing station, are able to be automatically adjusted such that the through-put processing speed of the machinery is relatively fast.

A last object of the present invention is to provide a new and improved machine, apparatus, or system, and a method of operating the same for applying tax stamps to individual packages of cigarettes contained within a carton of cigarettes wherein the various interactive or interoperative components of the machine, apparatus, or system which comprise, or are positioned at, for example, the carton flap opening station, the cigarette package stamping station, and the carton flap closing station, are able to be automatically adjusted such that the through-put processing speed of the machine, apparatus, or system is relatively fast and the through-put processing or output volume of the machine, apparatus, or system is relatively high.

SUMMARY OF THE INVENTION

The foregoing and other objectives are achieved in accordance with the teachings and principles of the present invention through the provision of a new and improved machine, apparatus, or system, and a method of operating the same, for applying tax stamps to individual packages of cigarettes contained within a carton of cigarettes, which comprises an infeed conveyor by means of which cartons of cigarettes are fed to a first cigarette carton size-determination station at which the height dimension of a particular carton of cigarettes is measured or determined. The height dimension of the particular carton of cigarettes is accordingly entered into the memory of a programmable logic controller (PLC), and the carton of cigarettes is then conveyed downstream toward a second carton-opening station at which the upper flaps of the cigarette carton are to be opened. The mechanism for opening the upper flaps of the cigarette carton is elevationally adjusted in accordance with the height dimension data stored within the memory of the programmable logic controller (PLC) so as to be capable of properly opening the upper flaps of the particular carton of cigarettes, and after the carton of cigarettes has been opened, the opened carton of cigarettes is conveyed further downstream toward a third cigarette package stamping station at which the individual packages of cigarettes will have tax stamps applied thereto.

As was the case with the mechanism disposed at the second cigarette carton opening station for achieving the opening of the upper flaps of the cigarette carton, the mechanism for implementing the stamping of the individual cigarette packages with the tax stamps is likewise elevationally adjusted in accordance with the height dimension data stored within the programmable logic controller (PLC) so as to be capable of properly applying the tax stamps to the individual cigarette packages of the particular carton of cigarettes. Lastly, the carton of cigarettes is conveyed still further downstream toward a fourth cigarette carton closing station at which the opened cigarette carton, containing the individual packages of cigarettes having the appropriate tax stamps applied thereto, will be closed as a result of the upper carton flaps being folded and re-glued. As was the case with the second and third cigarette carton opening and cigarette package stamping stations, the implements for folding and re-glueing the upper carton flaps are elevationally adjusted in accordance with the height dimension data stored within the programmable logic controller (PLC) so as to be capable of properly folding and re-glueing the upper flaps of the particular carton of cigarettes. Subsequently, the re-sealed cartons of cigarettes are removed from the last or fourth cigarette carton closing station for further packaging, for example, into commercial cigarette carton distribution boxes, cartons, or the like.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
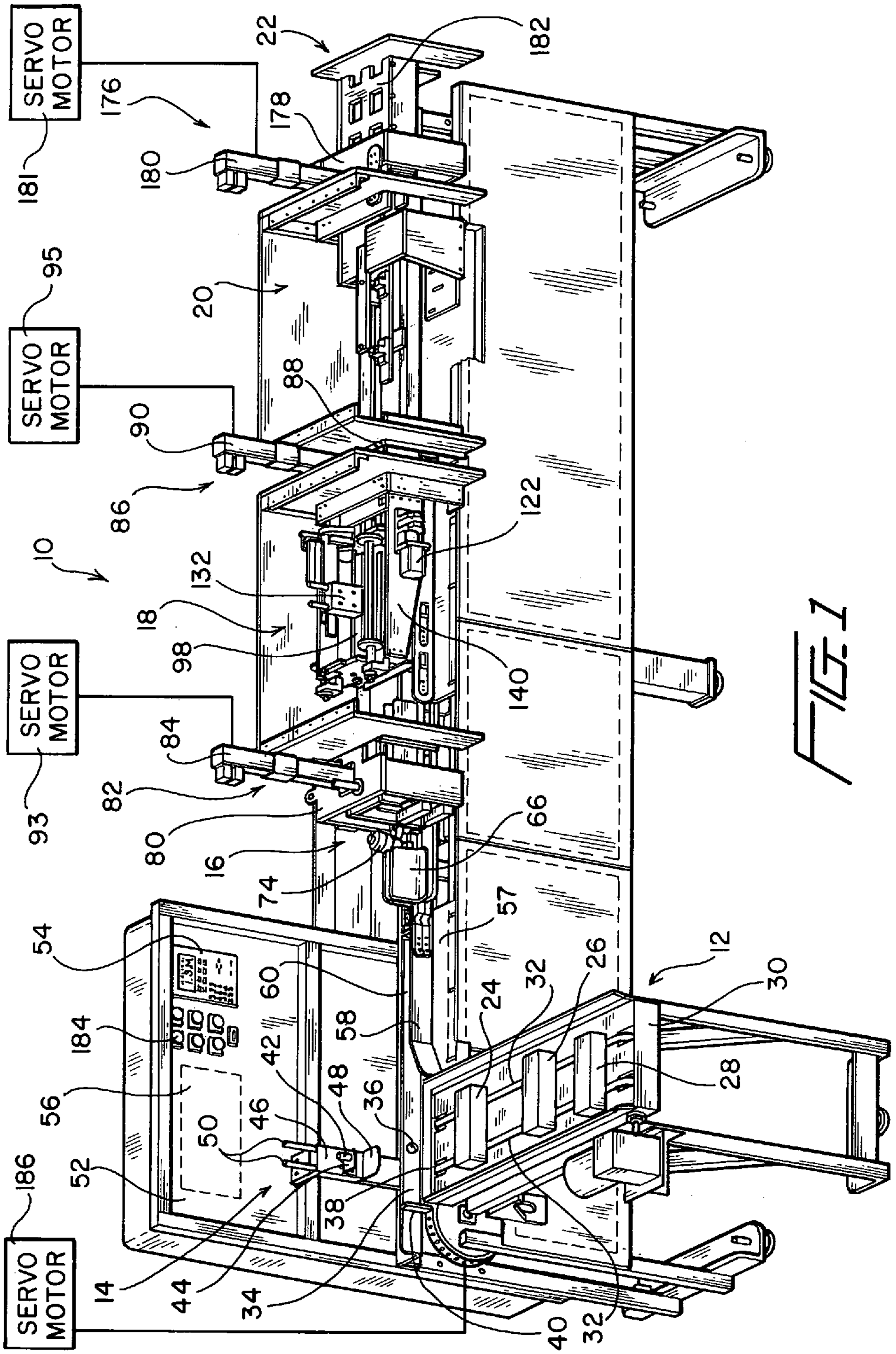
FIG. 1 is a perspective view of a new and improved machine, apparatus, or system which has been constructed in accordance with the principles and teachings of the present invention so as to be capable of automatically applying tax stamps to individual packages of cigarettes contained within a carton of cigarettes wherein the various implements of the machine, apparatus, or system, disposed at the various cigarette carton opening, cigarette package stamping, and cigarette carton closing stations, are automatically elevationally adjusted so as to readily accommodate cigarette cartons having different height dimensions.

Referring now to the drawings, and more particularly to FIG. 1 thereof, a new and improved machine, apparatus, or system, which has been constructed in accordance with the principles and teachings of the present invention so as to be capable of automatically applying tax stamps to individual packages of cigarettes contained within a carton of cigarettes, and in particular, wherein the various implements of the machine, apparatus, or system, disposed at the various cigarette carton opening, cigarette package stamping, and cigarette carton closing stations, are automatically elevationally adjusted so as to readily accommodate cigarette cartons having different height dimensions, is disclosed and is generally indicated by the reference character 10. More particularly, it is generally seen that the new and improved machine, apparatus, or system 10, constructed in accordance with the principles and teachings of the present invention, comprises a plurality of longitudinally spaced processing stations, such as, for example, a cigarette carton infeed location 12, a first cigarette carton height determination station 14, a second cigarette carton opening station 16, a third cigarette package tax stamp application station 18, a fourth cigarette carton closing station 20, and a fifth cigarette carton exit station 22. Initially, it is seen that a plurality of cartons of cigarettes having different height dimensions, as manufactured by means of different cigarette manufacturers and as exemplified by means of cigarette cartons 24,26,28, are placed upon an infeed table 30 at the cigarette carton in-feed location 12, and it is seen further that the infeed table 30 is provided with an infeed conveyor system comprising a pair of longitudinally spaced, transversely oriented conveyor belts 32,32 which serially convey the cartons of cigarettes 24,26,28 toward the first cigarette carton height determination station 14.

The first cigarette carton height determination station 14 comprises a backstop 34 within which there is disposed a proximity sensor 36 which effectively detects the presence of a cigarette carton when, for example, one of the cigarette cartons 24,26,28 has been conveyed by means of the conveyor belts 32,32 into engagement with the backstop 34. Interposed between the infeed table 30 with its conveyor belts 32,32, and the backstop 34 with its proximity sensor 36, is a longitudinally oriented conveyor belt 38 which has a plurality of perpendicularly oriented paddle or pusher members 40, only one of which is illustrated in FIG. 1, mounted upon the conveyor belt 38 at predetermined locations spaced along the longitudinal extent thereof such that when a particular one of the paddle or pusher members 40 is disposed at each one of the first cigarette carton height determination, second cigarette carton opening, third cigarette package tax stamp application, and fourth cigarette carton closing stations 14,16,18,20, the paddle or pusher member 40 will be disposed in a vertically upstanding mode. In this manner, as will become more apparent hereinafter, each one of the upstanding paddle or pusher members 40 is able to operatively engage an end face of a particular one of the cartons of cigarettes 24,26,28 which is disposed at a particular one of the aforenoted processing stations 14,16, 18,20 whereby the particular carton of cigarettes 24,26,28 can be conveyed longitudinally in the downstream direction from the first cigarette carton height determination station 14 toward the fifth cigarette carton exit station 22.

In accordance with a structural feature and component which is integrally critical to the operation of the new and improved apparatus, machine, or system which has been constructed in accordance with the teachings and principles of the present invention so as to be capable of automatically applying tax stamps to individual packages of cigarettes contained within a carton of cigarettes as a result of the various implements of the machine, apparatus, or system, disposed at the various cigarette carton opening, cigarette package stamping, and cigarette carton closing stations 16,18,20, being automatically elevationally adjusted so as to readily accommodate different cigarette cartons having different height dimensions, it is seen still further that the first cigarette carton height determination station 14 comprises an ultrasonic sensor 42. The ultrasonic sensor 42 is mounted upon a mounting bracket 44, and the mounting bracket 44 is, in turn, mounted upon a pneumatic control assembly 46. A horizontally disposed cigarette carton height determination plate 48 is disposed beneath the pneumatic control assembly 46 and is fixedly connected to lower end portions of a pair of pneumatically driven control rods 50 which are adapted to be reciprocally driven in vertically upward and downward directions within the pneumatic control assembly 46 by means of a suitable pneumatic drive system, not shown. The pneumatic control assembly 46 is seen to be mounted upon a suitable operator control panel, housing, or module 52 upon which a programmable logic controller (PLC) control panel 54 is also mounted which can be used for display purposes as well as manual input, automatic-override functions.

It is therefore to be appreciated that when a cigarette carton, such as for example, carton 24, is conveyed by means of the conveyor belts 32 into engagement with the backstop 34 such that the presence or disposition of the cigarette carton 24 is then detected by means of proximity sensor 36 disposed at the first cigarette carton height determination station 14, proximity sensor 36 emits a control signal to the pneumatic drive system, not shown, through means of a programmable logic controller (PLC) 56 disposed within the operator control housing 52, whereby the pneumatic drive system, not shown, causes the pneumatic control rods 50 to lower the cigarette carton height determination plate 48 into engagement with the upper surface portion of the first cigarette carton 24. Ultrasonic sensor 42 then determines the distance between itself and the cigarette carton height determination plate 48, and in this manner, since, for example, the distance from the ultrasonic sensor 42 to the conveyor belt 38, upon which the cigarette cartons 24, 26,28 are serially disposed, is known or has been predetermined, the height dimension of the first cigarette carton 24 can be readily determined or calculated. The aforenoted distance determined by means of the ultrasonic sensor 42, and which is therefore representative of the height dimension of the first cigarette carton 24, is then transmitted to the programmable logic controller (PLC) 56 in the form of voltage pulses which are stored within the programmable logic controller (PLC) 56 memory. As will become more apparent hereinafter, this stored height dimension data, characteristic of a particular one of the cigarette cartons 24,26,28, will then be utilized downstream at the second cigarette carton opening, the third cigarette package stamp application, and the fourth cigarette carton closing stations 16, 18,20 in order to achieve the automatic height adjustment of the various implements and mechanisms disposed at such second cigarette carton opening, third cigarette package stamp application, and fourth cigarette carton closing stations 16,18,20 in connection with the automatic processing of the cigarette cartons 24,26,28 comprising the automatic application of the tax stamps to the individual cigarette packages of the cigarette cartons 24,26,28.

With reference continuing to be made to FIG. 1, and with additional reference being made to FIG. 2, the structural details of the various implements and mechanisms disposed at the second cigarette carton opening station 16, and the operation of the same, will now be discussed. Extending downstream, as considered in the direction of conveyance of the cigarette cartons 24,26,28 from the first cigarette carton height determination station 14 to the fifth cigarette carton closing station 22, from the first cigarette carton height determination station 14 and toward the second cigarette carton opening station 16, there is provided a first angle plate 57 which is fixedly mounted to a horizontal bed of the machine, apparatus, or system 10 and which includes an upstanding guide member 58 which is transversely spaced from the backstop 34 so as to define therewith a channel 60 therebetween within which the cartons of cigarettes 24,26,28 are guided as they are conveyed downstream by means of a respective one of the conveyor paddles or pusher members 40. The downstream end portions of both the backstop 34 and the guide member 58 are respectively provided with spring fingers 62,64 which extend inwardly into the cigarette carton flow path defined by means of the channel 60 so as to effectively center the cartons of cigarettes 24,26,28 within the guide channel or flow path 60 as the cartons of cigarettes 24,26,28 approach the second cigarette carton opening station 16.

Downstream from the backstop 34 and the upstanding guide member 58, and disposed at the second cigarette carton opening station 16, a pair of transversely spaced upstanding guide plates 66,66 is provided for effectively continuing the centered guided movement of the cigarette cartons 24,26, 28 as they pass beyond the backstop 34 and the upstanding guide member 58 as a result of being conveyed downstream by a respective one of the conveyor paddles or pusher members 40. The lower end portion of each one of the upstanding guide plates 66 is provided with a horizontally extending bracket portion 68 which is fixedly mounted upon a support plate 70 wherein the support plates 70,70 are likewise transversely spaced with respect to each other so as to define a cigarette carton flow path or channel 72 therebetween. It is therefore appreciated that each one of the upstanding guide plates 66,66 is effectively mounted in a cantilevered manner upon its respective support plate 70 so as to be resiliently movable with respect to the flow path or channel 72 and therefore be capable of accommodating different cigarette cartons having different width dimensions. A substantially horizontally disposed rotatable wheel 74 is also mounted upon each support plate 70, and it is to be appreciated that the wheels 74,74 have their vertical rotational axes tilted inwardly toward each other. In addition, each wheel 74 is mounted upon a suitable spring assembly 76, which in turn is respectively mounted upon one of the support plates 70,70, so as to likewise be capable of accommodating different cigarette cartons having different width dimensions and thereby engaging side wall portions of such cigarette cartons 24,26,28 in a resilient manner as the cigarette cartons 24,26,28 are serially pushed or conveyed between the wheels 74,74. As a result of the cigarette cartons being pushed or conveyed between the wheels 74,74, and as a result of the resilient engagement of the wheels 74,74 with the side wall portions of the cigarette cartons 24,26,28, the upper or top surface flap members of the cigarette cartons 24,26,28 are effectively caused to flex upwardly or "dome" whereupon a plow member 78 can effectively be inserted beneath the domed carton flaps so as to fully open such upper surface flaps of the particular cigarette carton 24, 26,28, wherein the flaps will be disposed in a horizontal state, as the particular carton 24,26,28 continues along its flow path.

Figure 2:
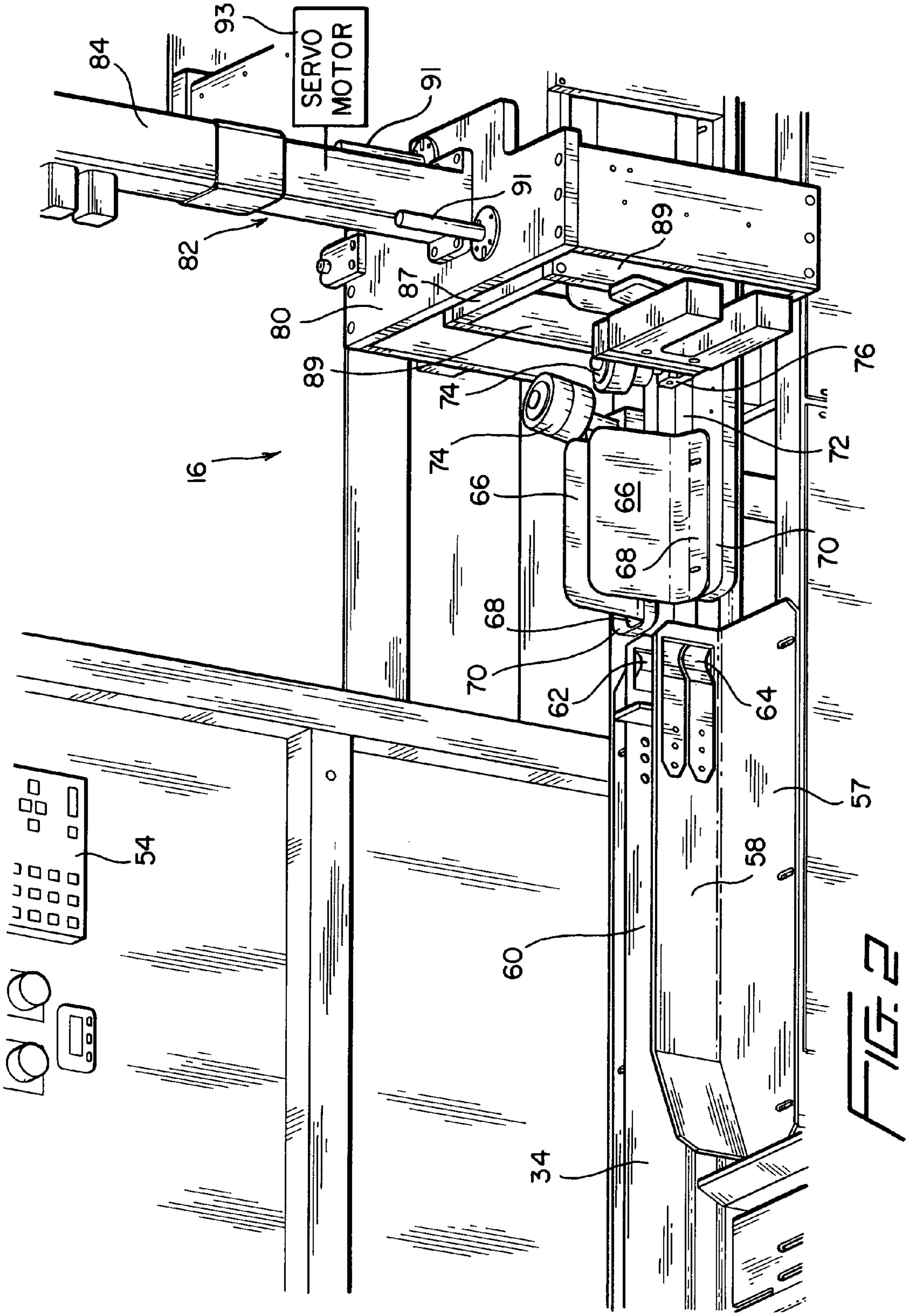
FIG. 2 is an enlarged perspective view of the cigarette carton opening station, as disclosed within FIG. 1, showing in greater detail the disposition and operative interaction of the various implements disposed at the cigarette carton opening station for achieving the opening of the upper flap members of the cigarette carton.
Figure 2A:
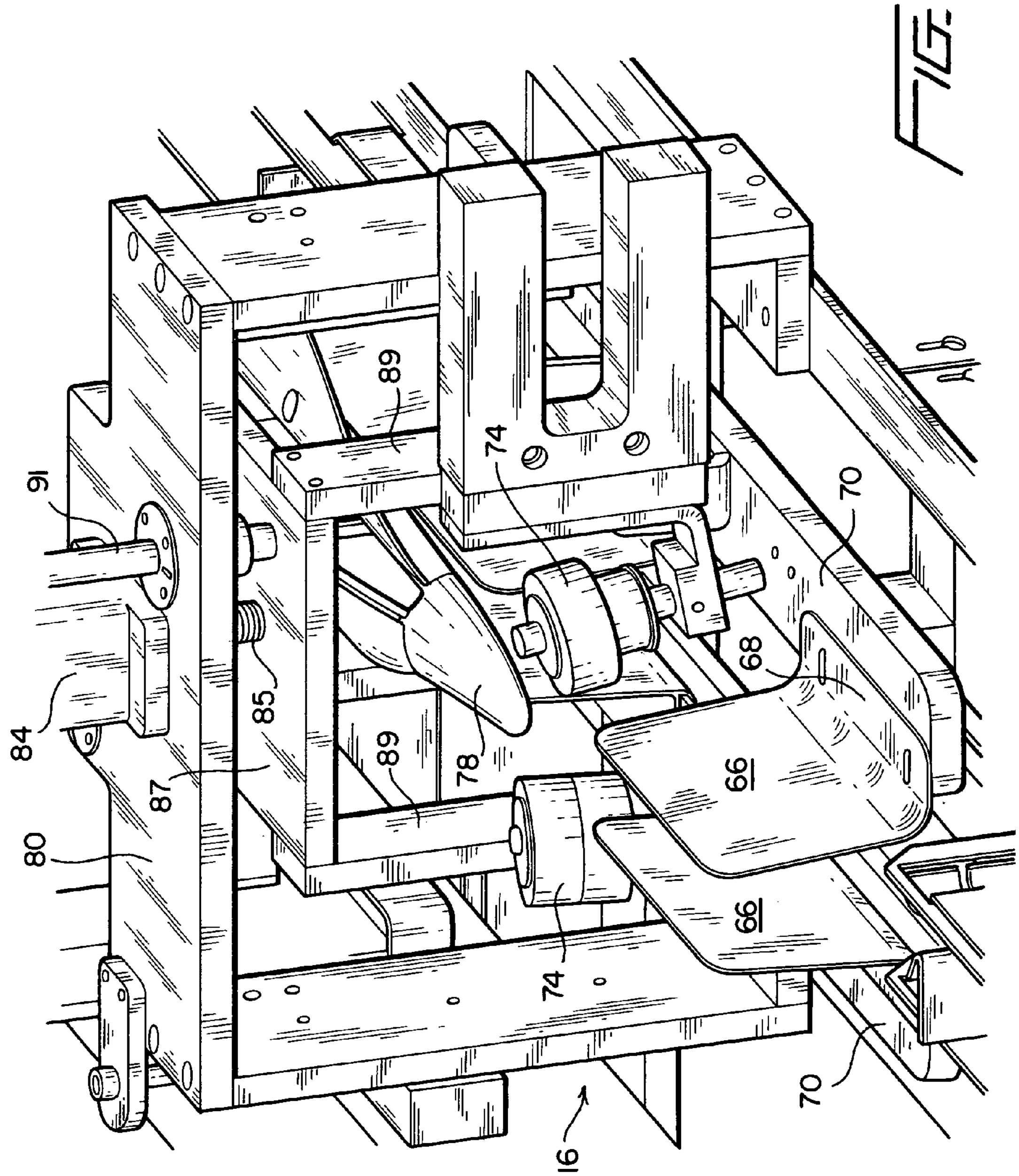
FIG. 2*a* is an enlarged perspective view of the cigarette carton opening station as disclosed within FIG. 2, showing in greater detail the disposition and operative interaction of the various implements disposed at the cigarette carton opening station for achieving the opening of the upper flap members of the cigarette carton.

With reference continuing to be made to FIGS. 1, 2, and 2*a*, it is seen that a first height adjustment mechanism housing 80 is disposed at the downstream end of the second cigarette carton opening station 16, and a first height adjustment mechanism 82 is mounted upon the housing 80. More particularly, the first height adjustment mechanism 82 comprises a first upstanding tower 84 within which a first height adjustment jack screw 85 is rotatably disposed, the lower end portion of the first height adjustment jack screw 85 being shown in FIG. 2*a*. The first jack screw 85 is operatively connected to a substantially inverted U-shaped housing 87, the lower end portions of the housing legs 89,89 being fixedly connected to the support plates 70,70. A pair of upstanding guide rods 91,91 have their lower end portions mounted within the housing 87 and extend upwardly through the housing 80 so as to control or guide the vertical movements of the housing 87 in a stable manner. The first jack screw 85 is adapted to be driven by means of a suitable servo drive mechanism 93, which is adapted to be controlled by means of the programmable logic controller (PLC) 56.

It is to be remembered that the height dimension data, characteristic of the first cigarette carton 24 and as determined by means of the ultrasonic sensor 42, was inputted into the memory of the programmable logic controller (PLC) 56, and accordingly, when the height dimension of such first cigarette carton 24 has been determined and stored within the memory of the programmable logic controller (PLC) 56, such data is also transmitted to the servo drive mechanism 93 operatively connected to the first height adjustment jack screw 85 of the first height adjustment mechanism 82. In this manner, the elevational disposition of the support plates 70,70, and accordingly, the elevational disposition of the guide plates 66,66, the doming wheels 74,74, and the plow 78 mounted upon the support plates 70,70, is properly adjusted such that the doming wheels 74,74 and the plow 78 can appropriately act upon, for example, the first cigarette carton 24 so as to open the upper surface flap members thereof.

It is to be appreciated that when the first cigarette carton 24 is moved from the first cigarette carton height determination station 14 to the second cigarette carton opening station 16 as a result of being conveyed downstream by means of a respective one of the upstanding conveyor paddles or pusher members 40 fixedly mounted upon the longitudinally oriented conveyor belt 38, the second cigarette carton 26 disposed upon the infeed table 30 will be moved toward the first cigarette carton height determination station 14 by means of the transversely oriented conveyor belts 32,32 so as to be disposed in contact or engagement with the backstop 34. Accordingly, the height dimension of the second cigarette carton 26 can now be determined in a manner similar to that previously described in connection with the determination of the height dimension of the first cigarette carton 24, and such height dimension data for the second cigarette carton 26 is subsequently transmitted to the programmable logic controller (PLC) 56 and stored within the memory thereof.

Accordingly, after the first cigarette carton 24 has had its upper surface carton flaps opened so as to thereby expose the individual packages of cigarettes disposed therewithin whereby the tax stamps can be applied thereto, the first cigarette carton 24 is now moved by means of its respective conveyor paddle or pusher member 40 from the second cigarette carton opening station 16 to the third cigarette package tax stamp application station 18, while the second cigarette carton 26 is similarly moved by means of its respective one of the conveyor paddles or pusher members 40 from the first cigarette carton height determination station 14 to the second cigarette carton opening station 16. As can be appreciated from FIGS. 1 and 3, the third cigarette package tax stamp application station 18 is provided with a second height adjustment mechanism 86, and in order to properly control the second height adjustment mechanism 86 such that the structural components operatively connected thereto are disposed at the proper height or elevational level for further processing the first cigarette carton 24 whereby the tax stamps can be applied to the individual cigarette packages thereof, the height dimension data characteristic of first cigarette carton 24 is now transmitted from the memory of the programmable logic controller (PLC) 56 to the second height adjustment mechanism 86.

In a similar manner, the height dimension data characteristic of the second cigarette carton 26 is simultaneously transmitted from the memory of the programmable logic controller (PLC) 56 to the first height adjustment mechanism 82 disposed at the second cigarette carton opening station 16 such that the doming wheels 74,74 and the plow 78 can act appropriately upon the second cigarette carton 26. As was the case with the first height adjustment mechanism 82 disposed at the second cigarette carton opening station 16, the second height adjustment mechanism 86 disposed at the third cigarette package tax stamp application station 18 comprises a housing 88 upon which the second height adjustment mechanism 86 is mounted. More particularly, the second height adjustment mechanism 86 comprises a second upstanding tower 90 within which a second height adjustment jack screw, not shown, is rotatably disposed. The second height adjustment jack screw, not shown, is adapted to be driven by means of a suitable servo-drive mechanism 95 which is adapted to be controlled by means of the programmable logic controller (PLC) 56. It is to again be remembered that the height dimension data, characteristic of the first cigarette carton 24, as determined by means of the ultrasonic sensor 42, and inputted into the memory of the programmable logic controller (PLC) 56, can now be transmitted from the programmable logic controller (PLC) 56 to the servo drive mechanism 95 operatively connected to the second height adjustment jack screw, not shown, of the second height adjustment mechanism 86 whereby the height adjustment or elevation of the various operative components or implements of the third cigarette package tax stamp application station 18 can be appropriately controlled as will be discussed more fully hereinafter.

Figure 3:
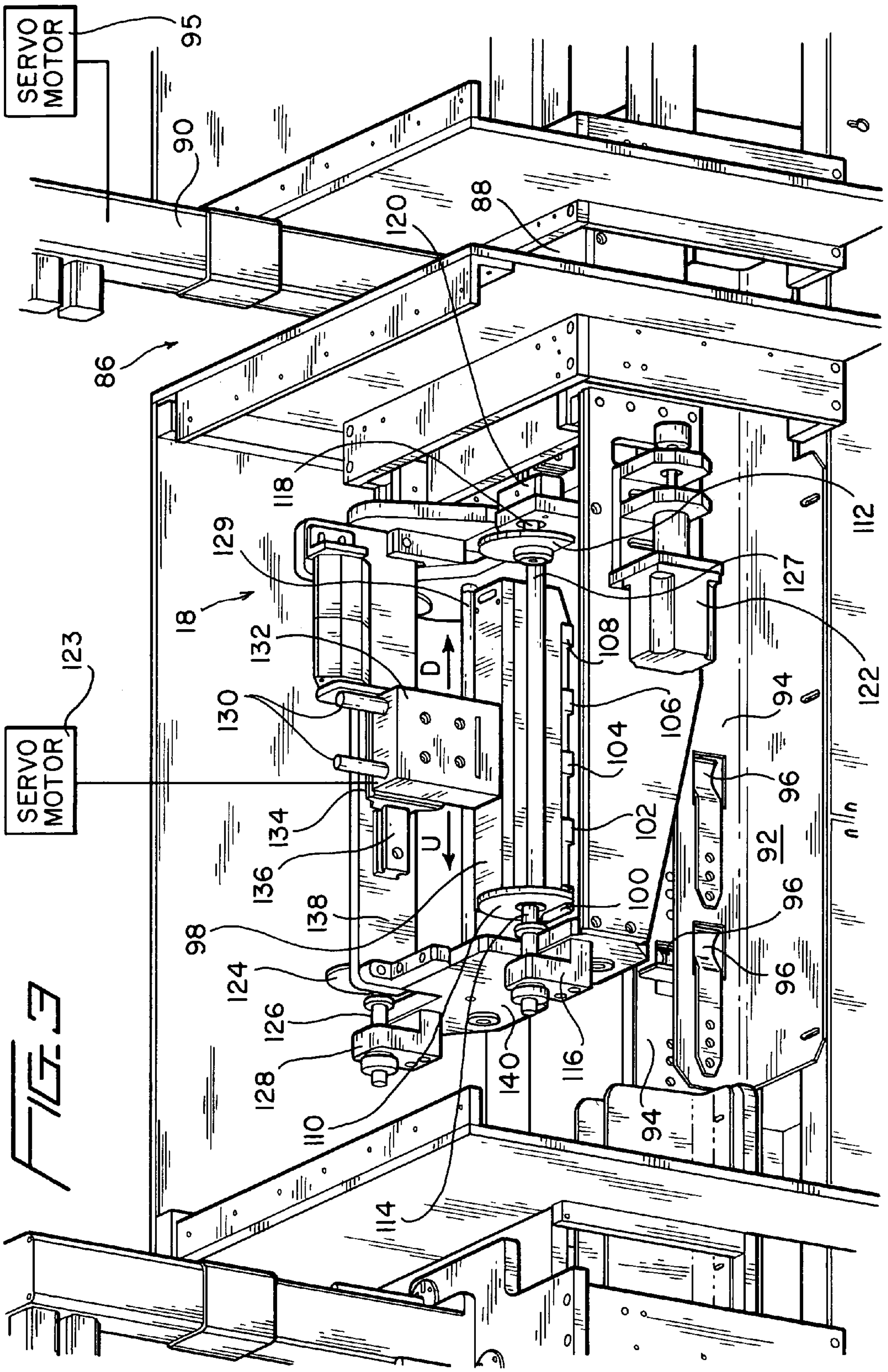
FIG. 3 is an enlarged perspective view of the cigarette package stamping station, as disclosed within FIG. 1, showing in greater detail the disposition and operative interaction of the various implements disposed at the cigarette package stamping station for achieving the stamping of the individual cigarette packages disposed within a particular cigarette carton.

With reference now being specifically made to FIG. 3, the details of the third cigarette package tax stamp application station 18 will be described. More particularly, a pair of transversely spaced angle plates 92 are fixedly connected to the bed of the machine, apparatus, or system 10, and in a manner similar to the first angle plate 57, each one of the angle plates 92 is provided with an upstanding portion 94 which cooperate together so as to thereby effectively continue the flow path channel for the conveyed cartons of cigarettes 24,26,28 from the second cigarette carton opening station 16 to the third cigarette package stamp application station 18. As was the case with the upstanding portion 58 of the angle plate 57, each one of the upstanding portions 94 of the angle plates 92 is provided with a pair of longitudinally spaced spring fingers 96,96 for engaging and maintaining the cartons of cigarettes 24, 26,28 centered along their longitudinal flow path. In accordance with primary or significant structure comprising the third cigarette package stamp application station 18, a stamping iron in the form of an iron block 98 is used to apply tax stamps onto the upper surface portions of the individual cigarette packages disposed within the cigarette cartons 24,26,28 wherein the bottom or lower surface of the stamping iron 98 is provided with a plurality of longitudinally spaced stamping iron shoes 100,102,104,106,108.

The tax stamps are provided as waxed impressions upon a supply roll of paper, the opposite ends of which are adapted to be mounted and supported upon a pair of disks 110,112 of a paper holder assembly, whereby the waxed tax stamps are effectively transferred from the supply roll of paper to the upper surface portions of the individual cigarette packages when the stamping iron shoes 100,102,104,106, 108 come into contact with the waxed tax stamps so as to effectively melt the same. The disk 110 is mounted upon a spindle 114 which is rotatably mounted in a spring-biased manner within a bearing assembly 116 so as to permit the supply roll of waxed tax stamp paper to be inserted between the disks 110, 112 when the disk 110 is effectively moved axially away from or relative to the disk 112, while disk 112 is mounted upon a spindle 118 which is rotatably mounted within a bearing assembly 120. Spindle 118 and disk 112 are operatively connected to a servo drive motor assembly 122 by suitable means, not shown, whereby when the supply roll of waxed tax stamp paper is mounted upon the disks 110,112, operation of the servo drive motor 122 serves to appropriately advance the supply roll of waxed tax stamp paper so as to serially present new or fresh tax stamp impressions to the stamping iron shoes 100,102,104,106,108. It is noted that the tax stamps are effectively pre-printed or pre-form ed upon the supply roll of paper within longitudinally extending rows comprising fifteen tax stamps per row, or in other words, each tax stamp is disposed within a particular row of tax stamps wherein each row of tax stamps has fifteen tax stamp positions. The cigarette packages are conventionally disposed inside each one of the cigarette cartons 24, 26,28 within an array comprising two rows of packages with each row of packages comprising five cigarette packages. In other words, the cigarette packages are disposed within an array comprising two rows and five columns. Accordingly, the stamping iron 98 is provided with the five stamping iron shoes 100,102,104,106,108 and it is noted that the transverse extent of each one of the stamping iron shoes 100,102,104,106,108 is large enough so as to effectively cover or thermally interact with both of the cigarette packages disposed within each one of the five columns of cigarette packages disposed within each one of the cigarette cartons 24,26,28. It is further noted that the stamping iron shoes 100,102,104,106,108 are longitudinally spaced from each other, as is clearly seen from FIG. 3, such that when the stamping iron 98 is disposed at a predetermined position at or relative to the third cigarette package tax stamp application station 18, each one of the stamping iron shoes 100,102,104, 106,108 will respectively thermally engage or interact with every third tax stamp pre-printed or pre-formed upon the roll of tax stamps. More particularly, in accordance with the unique and novel structural system characterizing the third cigarette package tax stamp application station 18 as constructed or developed in accordance with the principles and teachings of the present invention, the stamping iron 98 is adapted to be linearly moved in a longitudinally oriented mode and in precisely defined incremental steps in both the upstream or downstream directions, as denoted by means of the arrows U and D, by means of, for example, a suitable servo motor drive assembly 123.

Accordingly, when the stamping iron 98 is disposed at the first or downstream position, the stamping iron shoes 100, 102,104,106,108 will be positioned so as to thermally engage and interact with those tax stamps disposed upon the roll of tax stamp paper which are located at positions 1,4, 7,10, and 13 of the aforenoted fifteen tax stamp positions. Similarly, when the stamping iron 98 is disposed at the second or intermediate position, the stamping iron shoes 100, 102,104,106, 108 will be located or positioned so as to thermally engage and interact with those tax stamps disposed upon the roll of tax stamp paper which are located at positions 2,5,8,11, and 14 of the aforenoted fifteen tax stamp positions, and lastly, when the stamping iron 98 is disposed at the third or upstream location or position, the stamping iron shoes 100,102,104, 106,108 will be positioned so as to thermally engage and interact with those tax stamps disposed upon the roll of tax stamp paper which are located at positions 3,6,9,12, and 15 of the aforenoted fifteen tax stamp positions. The significance of this mode of operation will become better understood shortly hereinafter when a more detailed operation of the entire machine, apparatus, or system 10 is discussed. It is additionally noted that the third cigarette package tax stamp application station 18 is also provided with a take-up roll assembly by means of which used or depleted tax stamp paper is collected. In particular, as can be particularly appreciated from FIG. 3, the take-up roll assembly is partially disclosed as comprising a disk 124, a rotatable spindle 126, and a bearing assembly 128. The take-up roll assembly is also preferably operatively connected to the servo drive motor 122. Still further, it is noted that a pair of longitudinally extending guide rods 127 and 129 are operatively disposed adjacent to and upon opposite longitudinal sides of the stamping iron block 98 so as to effectively provide proper conveyance guidance for the waxed tax stamp paper as the same is unrolled from the supply roll of paper mounted upon the disks 110,112 and as the spent or depleted paper is rolled back up onto the take-up roll of paper mounted upon the disks 124.

In order to achieve the aforenoted linearly longitudinal movements of the stamping iron 98, as well as the height adjustment of the stamping iron 98 in order to optimally locate the same at an appropriate elevational level with respect to a particular carton of cigarettes 24,26,28, it is seen that the stamping iron 98 is fixedly mounted upon the lower end portions of a pair of upstanding control rods 130,130 and that the control rods 130,130 are movably disposed within an air cylinder assembly 132 so as to provide a predeterminedly defined operative stroke for the stamping iron 98. The air cylinder assembly 132 is fixedly mounted upon a support block 134, and the support block 134 is slidably mounted upon a linear slide 136. The support block 134 is operatively connected to the aforenoted servo motor drive 123 whereby the incremental or stepped movements of stamping iron 98 in the directions U,D are able to be achieved. Linear slide 136 is fixedly mounted upon a support bracket 138, and the support bracket 138 is in turn fixedly mounted upon a platform assembly 140. It is additionally noted that platform assembly 140 likewise supports or has mounted thereon the servo drive motor 122 as well as the disk, spindle, and bearing assembly components 110,112,114,116,118,120,124,126, 128.

Still further, it will be recalled that the second height adjustment mechanism 86 comprising second upstanding tower 90 has the second height adjustment jack screw, not shown, rotatably disposed therein, and in a manner similar to the operative connection of the first jack screw 85 to the support plates 70,70 of the second cigarette carton opening station 16, the second jack screw, not shown, of the second height adjustment mechanism 86 is operatively connected to the platform assembly 140. In this manner, the platform assembly 140 can be vertically positioned at a predeterminedly desired elevational level in accordance with appropriate signals or commands that are transmitted to the second jack screw drive mechanism, not shown, from the programmable logic controller (PLC) 56, which signals or commands are of course indicative of the height dimension of the first cigarette carton 24. Once the platform assembly 140 is therefore properly elevationally positioned, the programmable logic controller (PLC) 56 can then issue a suitable command to activate the drive mechanism, not shown, operatively associated with the air cylinder 132 whereby the control drive rods 130,130 are moved downwardly so as to in turn cause the stamping iron 98 to operatively engage that portion of the waxed tax stamp paper disposed above the cigarette packages, disposed within the cigarette carton 24, and thereby cause the tax stamps to be imprinted thereon or transferred thereto.

Figure 4:
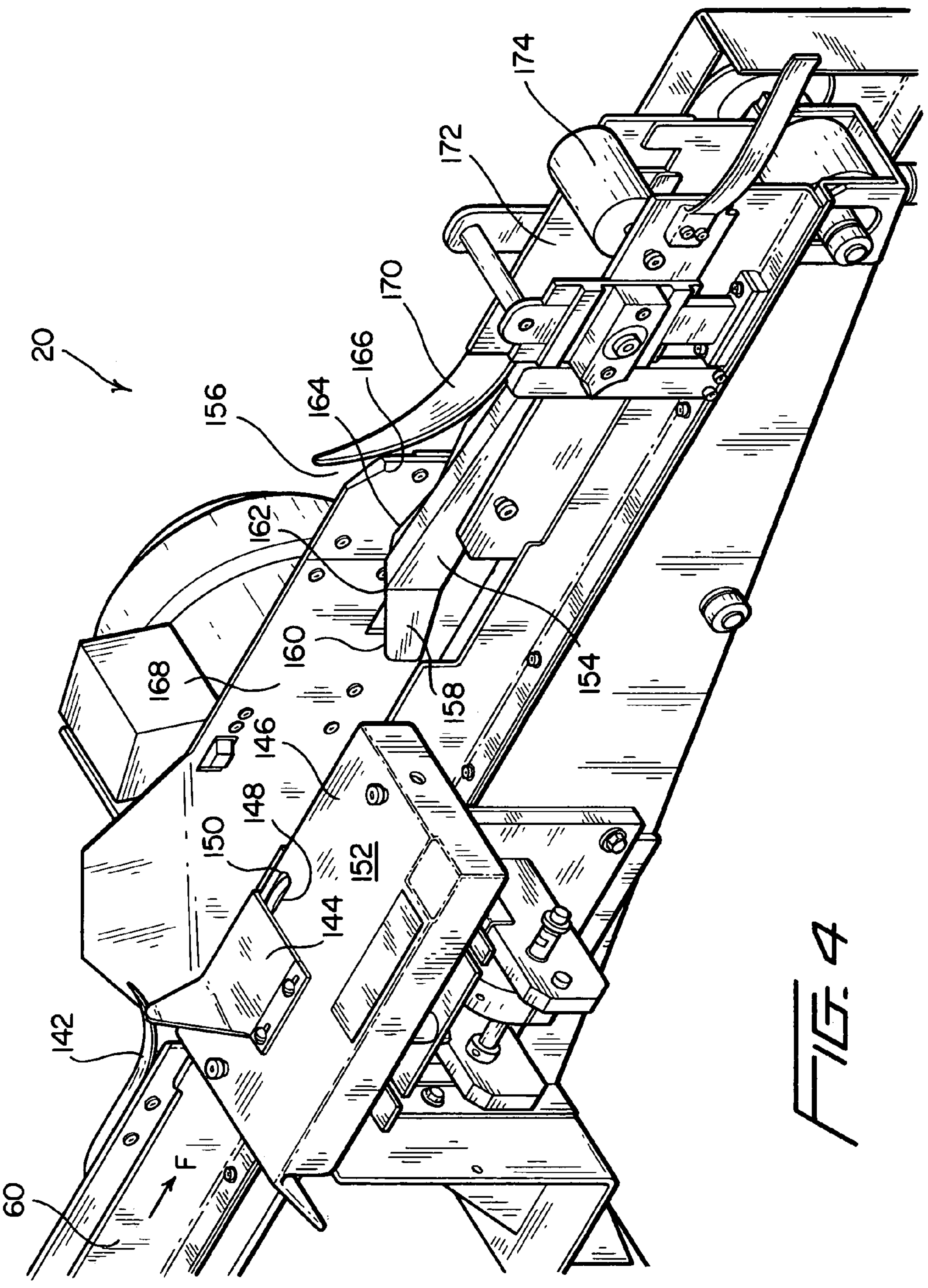
FIG. 4 is an enlarged perspective view of the cigarette carton closing station, as disclosed within FIG. 1, showing in greater detail the disposition and operative interaction of the various implements disposed at the cigarette carton closing station for achieving the closing of the cigarette cartons after the tax stamps have been applied to the individual cigarette packages thereof.

Referring lastly to FIGS. 1 and 4, the details of the fourth cigarette carton closing station 20 will now be described. More particularly, a particular one of the cigarette cartons 24,26,28 is conveyed from the third cigarette package tax stamp application station 18 toward the fourth cigarette carton closing station 20 along the cigarette carton conveyance flow path 60 as best seen in FIG. 4. It is to be remembered that the particular one of the opened cigarette cartons 24,26,28 has its upper surface flap members disposed in oppositely extending horizontally disposed open states, and that in accordance with the principles and teachings of the present invention, such upper surface carton flap members are now desired to be closed wherein, in effect, such flap members need to be moved through an arcuate extent of approximately 180° so as to be disposed in a horizontally oriented, overlapped closed state. The particular one of the cigarette cartons 24,26,28 which is being conveyed along the flow path 60 in the flow direction noted by means of the arrow F, has, as is conventional, a smaller one of the upper surface cigarette carton flap members extending toward the left of the flow path 60 as viewed in FIG. 4, while the larger one of the upper surface cigarette carton flap members extends toward the right of the flow path as viewed in FIG. 4.

Accordingly, an upwardly arcuate leaf plate member 142 is provided upon the upstream end of the cigarette carton closing station 20 so as to engage the rightward extending larger one of the upper surface carton flap members and thereby cause the same to attain a substantially vertical orientation as the particular cigarette carton 24,26,28 is moved along the flow path 60, while the leftward extending, horizontally disposed smaller one of the upper surface carton flap members is caused to pass beneath a guide bracket 144. The guide bracket 144 is fixedly mounted atop a glue pot 146, and a portion of a glue applicator wheel 148, rotatably mounted within an interior portion of the glue pot 146, projects upwardly through a slot 150 defined within an upper surface portion 152 of the glue pot 146 so as to apply a suitable adhesive or glue to an undersurface portion of the horizontally extending smaller one of the upper surface cigarette carton flap members when such flap member is so disposed in its open state. At an intermediate downstream location of the cigarette carton closing station 20, there is further provided a pair of carton flap closers 154,156, and it is seen that the upstream end portion of the carton flap closer 154 is disposed axially upstream with respect to the upstream end portion of the carton flap closer 156. This structural arrangement of the flap closers 154,156 therefore permits the flap closer 154 to begin or initiate closure of the smaller carton flap member before closure of the larger carton flap member is commenced or initiated in order to facilitate the overlapped folding, closure, and sealing of the flap members with respect to each other.

More particularly, it is seen that the flap closer 154, which is adapted to engage the smaller carton flap member in order to initiate the folding movement thereof from its leftward extending opened position toward its rightward extending closed position, comprises an upstream end tab portion 158 which has an upwardly inclined upper edge surface 160. The upper edge surface 160 terminates at an elevated point or apex portion 162, and a downwardly sloped surface portion 164 extends downwardly from the apex portion 162.

In this manner, as the smaller carton flap encounters the flap closer 154, the upwardly inclined edge surface 160 will cause the smaller carton flap to be moved from its leftwardly extending horizontally disposed opened position to a substantially vertical position, and as a result of the momentum engendered by means of such movement of the smaller flap member, as well as the momentum characteristic of the movement of the particular cigarette carton 24, 26,28 along the flow path 60, the smaller carton flap will tend to move downwardly along the downwardly sloped surface portion 164 until it is disposed in its rightwardly extending horizontally disposed closed position. In a similar manner, the flap closer 156 is seen to comprise two cooperative components for moving the larger carton flap member, which has already been moved to a substantially vertical state by means of the arcuate leaf plate member 142, from the substantially vertical state to a leftwardly extending horizontally disposed closed state. In particular, the first cooperative component of the flap closer 156 comprises a tab member 166 which is integrally mounted upon a rear wall member 168 partially defining the flow path 60 and which extends transversely inwardly with respect to the flow path 60. The second operative component of the flap closer 156 comprises a downwardly extending arcuate plate member 170.

In this manner, it may therefore be readily appreciated that as the vertically oriented larger carton flap encounters the transversely inwardly extending tab member 166, the larger carton flap will begin to be folded as a result of having been caused to move from its vertical orientation toward a horizontal orientation or disposition, and when the partially folded larger carton flap then encounters the downwardly extending arcuate plate member 170, the larger carton flap member will have been folded atop the smaller carton flap member which will have just previously completed its folding operation as a result of having traversed or moved along the downwardly sloped surface portion 164 of the smaller carton flap closer 154. It will be remembered that the smaller carton flap member previously had glue or adhesive applied to the undersurface portion thereof by means of the glue wheel 148, however, in view of the inward folding of the smaller carton flap member from its outward extending state by means of the flap closer 154, the glue or adhesive is now effectively disposed upon the upwardly facing surface portion of the smaller carton flap member whereby the larger carton flap member, which has been folded over the smaller carton flap member in an overlapping mode, can be adhered thereto so as to in fact seal the particular cigarette carton 24,26,28 in a closed state. In order to ensure that the larger and smaller carton flap members are in fact secured together in their overlapped folded and sealed mode, the cigarette carton closing station 20 further comprises a downstream sealing section which comprises a pressure plate 172 and a pressure roller 174. As the folded overlapped carton flap members pass beneath the pressure plate 172 and the pressure roller 174, the larger overlapping carton flap member is forced into pressured engagement with the underlying smaller carton flap member so as to be securely adhered thereto.

As has been previously noted in connection with the second cigarette carton opening station 16 and the third cigarette package tax stamp application station 18, in order for the machine, apparatus, or system 10 of the present invention to accommodate and process different cigarette cartons having different height dimensions, that is, in order for the machine, apparatus, or system 10 to be capable of applying tax stamps to the cigarette packages of differently sized cigarette cartons, the various operative components or implements of such cigarette carton opening and cigarette package tax stamp application stations 16,18 were effectively mounted upon height adjustable mechanisms. Accordingly, it can therefore be readily and additionally appreciated that the various operative components or implements of the fourth cigarette carton closing station 20 are likewise operatively connected to a third height adjustable mechanism 176. More particularly then, with reference again being made to FIG. 1, it is seen that the third height adjustable mechanism 176 disposed at the fourth cigarette carton closing station 20 comprises a housing 178 upon which the third height adjustment mechanism 176 is mounted. More particularly, the third height adjustment mechanism 176 comprises a third upstanding tower 180 within which a third height adjustment jack screw, not shown, is rotatably disposed. The third height adjustment jack screw, not shown, is adapted to be driven by means of a suitable servo-drive mechanism 181 which, in a manner similar to the first and second height adjustment jack screws of the first and second height adjustment mechanisms 82,86, is adapted to be controlled by means of the programmable logic controller (PLC) 56.

It is to again be remembered that the height dimension data, characteristic of the first cigarette carton 24, as determined by means of the ultrasonic sensor 42, and inputted into the memory of the programmable logic controller (PLC) 56, can now be transmitted from the programmable logic controller (PLC) 56 to the drive mechanism, not shown, operatively connected to the third height adjustment jack screw, not shown, of the third height adjustment mechanism 176 whereby the height adjustment or elevation of the various operative components or implements of the fourth cigarette carton closing station 20 can be appropriately controlled. In particular, in accordance with the principles and teachings of the present invention, the operative components or implements of the fourth cigarette carton closing station 20 which are to be appropriately elevationally controlled by means of the third height adjustment jack screw, not shown, comprises the glue pot assembly 146, the flap closer assemblies 154,156, and the hold down components 172, 174. As was the case with the various operative components of the first and second height adjustment mechanisms 82,86, the glue pot assembly 146, the flap closer assemblies 154, 156, and the hold down components 172,174 of the third height adjustment mechanism 176 are mounted upon a common support plate, base plate, or bracket, not shown, which is operatively connected to the third height adjustment jack screw, not shown.

Continuing further, and lastly describing the disposition of the particular one of the cigarette cartons 24, 26,28 after a particular one of the cartons 24,26,28 has been closed and sealed as a result of its upper flap members again being folded and glued together in an overlapping mode at the fourth cigarette carton closing station 20, the closed and resealed cigarette carton 24,26,28 is further conveyed downstream to the fifth cigarette carton exit station 22 so as to be further processed for eventual distribution. Accordingly, the fifth cigarette carton exit station 22 may comprise an outfeed table 182, or alternatively, the fifth cigarette carton exit station 22 may comprise an additional conveyor, not shown, for receiving the processed cigarette cartons and for transmitting the same to a remote location, for example, for further packaging or the like, or still yet further, the fifth cigarette carton exit station 22 may comprise a packing mechanism, not shown, by means of which the cigarette cartons 24,26,28, having had tax stamps applied to the individual cigarette packages contained therein, are repacked into distribution cartons, boxes, or crates within which a plurality of the cigarette cartons 24,26, 28 are packed for commercial distribution.

A brief overall operation of the new and improved machine, apparatus, or system 10, which has been constructed in accordance with the principles and teachings of the present invention so as to be capable of automatically applying tax stamps to individual packages of cigarettes contained within a carton of cigarettes 24,26,28, and in particular, wherein the various implements of the machine, apparatus, or system 10, disposed at the various cigarette carton opening, cigarette package stamping, and cigarette carton closing stations 16,18,20, are automatically elevationally adjusted so as to readily accommodate cigarette cartons having different height dimensions, will now be described. As has been noted hereinbefore, a plurality of cigarette cartons 24,26, 28 are placed upon the infeed table 30 and are conveyed toward the first cigarette carton height determination station 14 by means of the transversely oriented parallel conveyor belts 32,32.

The first cigarette carton 24 accordingly encounters the backstop 34 at which time the proximity sensor 36 senses the presence of the first cigarette carton 24. As has also been noted hereinbefore, the proximity sensor 36 is in communication with the programmable logic controller (PLC) 56 whereby, as a result of receiving a signal from the proximity sensor 36, the programmable logic controller (PLC) 56 now energizes the pneumatic control assembly 46 so as to cause the control rods 50,50 to lower the cigarette carton height determination plate 48 into engagement with the upper surface of the first cigarette carton 24 so as to determine the height dimension thereof. This height dimension data characteristic of the first cigarette carton 24 is transmitted into the memory of the programmable logic controller (PLC) 56 and, in turn, such height dimension data characteristic of the first cigarette carton 24 is also transmitted to the first height adjustment mechanism 82 disposed at the second cigarette carton opening station 16 such that the housing 87 upon which the support plates 70, the doming wheels 74, and the plow 78 are disposed, can be positioned at the proper height elevation in connection with the first cigarette carton 24 when the first cigarette carton 24 arrives at the second cigarette carton opening station 16. The operation of the new and improved machine, apparatus, or system 10, constructed in accordance with the principles and teachings of the present invention, is therefore now ready to be initiated.

Accordingly, an operator may, for example, push a START button 184 located upon the control housing 52, and a servo motor drive system 186, operatively connected to the longitudinal conveyor belt 38, is energized through means of the programmable logic controller (PLC) 56 whereby the first cigarette carton 24 is now moved from the first cigarette carton height determination station 14 to the second cigarette carton opening station 16. It is to be noted that the conveyor system 38 may initially be calibrated in such a manner that one of the upstanding conveyor paddles or pusher members 40 is disposed at the first cigarette carton height determination station 14 so as to be disposed immediately adjacent to the end face of the cigarette carton disposed against the backstop 34, and in this manner, the upstanding conveyor paddle or pusher member 40 can readily engage the cigarette carton so as to convey the same toward the second cigarette carton opening station 16 when the conveyor 38 is activated. It is also noted that the upstanding conveyor paddles or pusher members 40 are all located a predetermined distance apart from each other, for example, thirty-one inches (31"), and that the first cigarette carton height determination station 14, the second cigarette carton opening station 16, the third cigarette package tax stamp application station 18, and the fourth cigarette carton closing station 20 are likewise all located the same predetermined distance apart from each other, that is, thirty-one inches (31"). In this manner, when the programmable logic controller (PLC) 56 energizes the conveyor servo motor drive system 186 so as to drive the conveyor 38 the predetermined distance of, for example, thirty-one inches (31"), a conveyor paddle or pusher member 40 will be disposed at each one of the cigarette carton processing stations 16,18,20 so as to properly position one of the cigarette cartons 24,26,28 at one of such processing stations 16,18,20 and to properly move its associated cigarette carton 24,26,28 to the next processing station.

Continuing further, as the first conveyor paddle or pusher member 40 conveys the first cigarette carton 24 from the first cigarette carton height determination station 14 to the second cigarette carton opening station 16, the programmable logic controller (PLC) 56 activates the pneumatic control assembly 46 so as to cause the control rods 50,50 to vertically retract the height determination plate 48, and the conveyor belts 32,32 will cause the second cigarette carton 26 to encounter the backstop 34. When the servo motor drive 186 has driven the conveyor 38 the aforenoted predetermined distance such that the first cigarette carton 24 is now positioned at the second cigarette carton opening station 16, drive movement of the conveyor 38 by means of its servo motor drive 186 is terminated whereby the first cigarette carton 24 is now disposed just upstream of the doming wheels 74 and the upper flap member opening plow 78. The programmable logic controller (PLC) 56, in response to a signal from the proximity sensor 36, now activates the pneumatic control assembly 46 to again lower the height determination plate 48, through means of the control rods 50, 50, whereby the height dimension of the second cigarette carton 26 is now determined. As was the case in connection with the first cigarette carton 24, the height dimension data for the second cigarette carton 26 is transmitted to and stored within the memory of the programmable logic controller (PLC) 56. Depression of the START button 184 by the operator again activates the servo drive motor 186 whereby the conveyor 38, through means of its conveyor paddles or pusher members 40, again advances the first cigarette carton 24 from the second cigarette carton opening station 16 toward the third cigarette package tax stamp application station 18, while simultaneously advancing the second cigarette carton 26 from the first cigarette carton height determination station 14 to the second cigarette carton opening station 16. In addition, the third cigarette carton 28 is advanced into engagement with the back stop 34 by means of the conveyor belts 32,32.

It will be remembered that the first cigarette carton 24 was disposed immediately upstream of the cigarette carton doming wheels 74 and plow 78 and that the height dimension data characteristic of such first cigarette carton 24 was transmitted from the programmable logic controller (PLC) 56 to the servo drive motor 93 for the first jack screw 85 of the first height adjustment mechanism 82 so as to position the doming wheels 74 and the plow 78 at a predeterminedly proper elevation with respect to the first cigarette carton 24 disposed upstream of the doming wheels 74 and plow 78. Accordingly, as the first cigarette carton 24 is being moved from the second cigarette carton opening station 16 to the third cigarette package tax stamp application station 18, the doming wheels 74 and plow 78 serve to open the upper surface flap members of the first cigarette carton 24 such that the individual cigarette packages thereof will be exposed and readily accessible to having the tax stamps applied thereto.

In a similar manner, the height dimension data for the first cigarette carton 24 is also transmitted from the programmable logic controller (PLC) 56 to the second height adjustment mechanism 86 so as to control the servo drive motor 95 for the jack screw, not shown, thereof and thereby elevationally position the platform assembly 140 upon which, for example, the stamping iron 98 is located such that the stamping iron 98 is properly located with respect to the incoming first cigarette carton 24. It is to be noted that when the first cigarette carton 24 has effectively cleared or entirely passed through the second cigarette carton opening station 16, the programmable logic controller (PLC) 56 will then transmit appropriate drive signals to the servo motor drive mechanism 93 for the first height adjustment jack screw 85 in order to elevationally adjust the housing 87 and the support plates 70, and therefore the doming wheels 74 and plow 78, in accordance with the height dimension data characteristic of the second cigarette carton 26 in preparation for opening the same. At the same time, the height dimension of the third cigarette carton 28 is being determined at the first cigarette carton height determination station 14 by means of the ultrasonic sensor 42, as controlled by means of the proximity sensor 36 and the programmable logic controller (PLC) 56, in accordance with the mode of operation previously discussed in connection with the first and second cigarette cartons 24,26.

The programmable logic controller (PLC) 56 controls the energization of the conveyor servo motor 186 such that movement of the conveyor 38 will be appropriately terminated so as to accurately position the first opened cigarette carton 24 at the third cigarette package tax stamp application station 18 while the second cigarette carton 26 is positioned at the second cigarette carton opening station 16 so as to be located just upstream of the doming wheels 74 and plow 78. At this point in time, and from this time forward, the entire operation of the machine, apparatus, or system 10 is automatically controlled by means of the programmable logic controller (PLC) 56 and is always controlled by means of the commencement and completion of the tax stamp application operation being performed upon a particular cigarette carton 24,26,28 disposed at the cigarette carton tax stamp application station 18. More particularly, when the first cigarette carton 24 is disposed at the third cigarette package tax stamp application station 18, the programmable logic controller (PLC) 56 ensures that the stamping iron 98 is disposed at its first linear position whereby the stamping shoes 100,102,104,106,108 will be disposed with respect to the waxed tax stamp paper so as to print or transfer the tax stamps which are disposed at positions 1,4,7,10, and 13 upon the waxed tax stamp paper. In addition, the programmable logic controller (PLC) 56 also issues a command to the air cylinder assembly 132 whereby the control rods 130,130 thereof will lower the stamping iron 98 into engagement with the waxed tax stamp paper so as to cause the tax stamps to be printed or transferred onto the cigarette packages of the first cigarette carton 24. The programmable logic controller (PLC) 56 will cause the stamping iron 98 to be maintained in engagement with the cigarette packages of cigarette carton 24 for a predetermined period which is based both upon time and pressure factors so as to permit the waxed tax stamps to be properly transferred from the waxed tax stamp paper to the cigarette packages.

At the conclusion of such predetermined period, the programmable logic controller (PLC) 56 issues a command to the air cylinder assembly 132 so as to raise the stamping iron 98 back to its home position out of engagement with the cigarette packages of the first cigarette carton 24, and subsequently, the programmable logic controller (PLC) 56 issues an additional command to the servo drive motor 186 for the conveyor 38 so as to again energize the same whereby the first cigarette carton 24 will be moved to the fourth cigarette carton closing station 20, the second cigarette carton 26 will be moved to the third cigarette package tax stamp application station 18, and the third cigarette carton 28 will be moved to the second cigarette carton opening station 16. The programmable logic controller (PLC) 56 also transmits appropriate signals to the first, second, and third height adjustment mechanisms 82,86,176 so as to energize the servo drive motors 93,95,181 thereof whereby the glue pot 146, carton flap closers 154,156, and the hold-down plate and roller components 172,174 of the fourth cigarette carton closing station 20, the stamping iron 98 of the third cigarette package tax stamp application station 18, and the doming wheels 74 and plow 78 of the second cigarette carton opening station 16 will be elevationally adjusted in accordance with the height dimension data of the first, second, and third cigarette cartons 24,26,28 now respectively disposed at the fourth cigarette carton closing station 20, the third cigarette package tax stamp application station 18, and the second cigarette carton opening station 16.

When the first cigarette carton 24 is disposed at the fourth cigarette carton closing station 20, it is noted that the cigarette carton 24 is actually disposed just upstream of the glue pot 146 and the leaf plate 142. Accordingly, in a manner similar to the movement of the particular cigarette carton from the second cigarette carton opening station 16 to the third cigarette package tax stamp application station 18 whereby the particular cigarette carton is actually opened while the cigarette carton is being moved from the second cigarette carton opening station 16 to the third cigarette package tax stamp application station 18, when the programmable logic controller (PLC) 56 energizes the servo drive motor 186 so as to drive the conveyor 38 and thereby move the cigarette cartons 24,26,28 from their respective fourth cigarette carton closing station 20, third cigarette package tax stamp application station 18, and second cigarette carton opening station 16, the first cigarette carton 24 is actually closed while the cigarette carton 24 is being moved from the fourth cigarette carton closing station 20 toward the fifth cigarette carton exit station 22. At the cigarette carton exit station 22, the re-closed and re-sealed cigarette carton 24 is of course disposed either upon the out-feed table 182, or operatively associated with the previously noted additional conveyor, not shown, or carton or box packer, also not shown.

It is particularly noted that programmable logic controller (PLC) 56 and the various height adjustment components respectively disposed at the fourth cigarette carton closing station 20, the third cigarette package tax stamp application station 18, and the second cigarette carton opening station 16 comprises a fully integrated system whereby the programmable logic controller (PLC) 56 is capable of constantly tracking and monitoring the disposition of the cigarette cartons 24,26,28 along the conveyor 38 as well as the disposition of height adjustment mechanisms 82,86,176 and the various operative implements controlled thereby. Therefore the disposition of the height adjustment mechanisms 82, 86,176, and that of the various operative implements thereof, can be controlled in a smoothly integrated manner whereby the cigarette cartons 24,26,28 can be serially processed in a continuous manner without operative interference or interruptions. It is to be additionally noted that when the second cigarette carton 26 is disposed at the third cigarette package tax stamp application station 18, the programmable logic controller (PLC) 56 will issue a command to the servo motor drive 123 operatively connected to the support block 134 so as to ensure that the stamping iron 98 is linearly advanced to its second linear position whereby stamping shoes 100,102,104,106,108 can now transfer the tax stamps located at positions 2,5,8,11,14 upon the waxed tax stamp paper. In a similar manner, when the third cigarette carton 28 is likewise disposed at the third cigarette package tax stamp application station 18, the programmable logic controller (PLC) 56 will issue a command to the servo motor drive 123 operatively connected to the support block 134 so as ensure that the stamping iron 98 is linearly advanced to its third linear position such that the stamping shoes 100,102,104,106,108 can now transfer the tax stamps located at positions 3,6,9,12,15 upon the waxed tax stamp paper. At the conclusion of the aforenoted three tax stamp printing or transfer operations by means of which the tax stamps have been printed or transferred from each one of the fifteen positions across the waxed tax stamp paper, and within both of two adjacent rows of tax stamps, onto the cigarette packages of the three cigarette cartons 24,26,28, the programmable logic controller (PLC) 56 will also issue a command to the servo motor drive 122 so as to advance the waxed tax stamp paper a distance equivalent to two rows of the tax stamps whereby two fresh or new rows of tax stamps are now available for printing or transfer onto the cigarette packages of three new cigarette cartons.

Thus, it may be seen that in accordance with the principles and teachings of the present invention, there has been disclosed a machine, apparatus, or system, and a method of operating the same, whereby tax stamps can be automatically applied to individual cigarette packages disposed within cigarette cartons, regardless of the fact that the cigarette cartons may be manufactured by different manufacturers and therefore may have different height dimensions, as a result of the various implements disposed at the cigarette carton opening, cigarette package tax stamp application, and cigarette carton closing stations being automatically elevationally adjusted. In particular, as a result of each cigarette carton having its height dimension initially determined at a height determination station, and as a result of the height dimension data being forwarded to and stored within the memory of a programmable logic controller (PLC) which is also integrated with the various implements disposed at the cigarette carton opening, cigarette package tax stamp application, and cigarette carton closing stations, the elevational disposition of the various implements disposed at the cigarette carton opening, cigarette package tax stamp application, and cigarette carton closing stations can be automatically adjusted so as to properly, accurately, and rapidly open the cigarette cartons, apply the tax stamps to the cigarette packages disposed therein, and re-close the cigarette cartons.

Obviously, many variations and modifications of the present invention are possible in light of the above teachings. It is therefore to be understood that within the scope of the appended claims, the present invention may be practiced otherwise than as specifically described herein.

The invention claimed is:

1. Apparatus for applying tax stamps onto cigarette packages disposed within different cigarette cartons having different height dimensions, comprising:

a conveyor for serially conveying a plurality of different cigarette cartons having different height dimensions;

a contact member movably disposed at a cigarette carton height determination station for movement into contact engagement with an upper surface portion of a particular one of the plurality of different cigarette cartons, having different height dimensions, disposed at said cigarette carton height determination station;

ultrasonic sensor means, disposed at said cigarette carton height determination station, for sensing the distance of said contact member, disposed in contact with the upper surface portion of the particular one of the plurality of different cigarette cartons having the different height dimensions and disposed at said cigarette carton height determination station, from said sensor means and therefore for determining the particular height dimension of the one of the plurality of different cigarette cartons, having the different height dimensions, disposed at said cigarette carton height determination station, and for generating data indicative of the particular height dimension of the particular one of the plurality of different cigarette cartons, having the different height dimensions, disposed at said cigarette carton height determination station;

tax stamp application means disposed at a cigarette package tax stamp application station for applying tax stamps to individual cigarette packages disposed within each one of the plurality of cigarette cartons, having the different height dimensions, as each cigarette carton is disposed at said cigarette package tax stamp application station; and first means for automatically adjusting the elevational disposition of said tax stamp application means, disposed at said cigarette package tax stamp application station, in accordance with said height dimension data characteristic of the particular one of the plurality of different cigarette cartons having the different height dimensions, as determined by said contact member and said sensor means disposed at said cigarette carton height determination station, as each one of the plurality of different cigarette cartons, having the different height dimensions, is respectively disposed at said cigarette package tax stamp application station, such that said tax stamp applicator will be properly positioned with respect to the particular one of the plurality of different cigarette cartons, having the different height dimensions, which is being conveyed to said cigarette package tax stamp application station by said conveyor so as to be capable of properly applying tax stamps to the individual cigarette packages of the particular one of the plurality of different cigarette cartons, having the different height dimensions, when the particular one of the plurality of different cigarette cartons, having the different height dimensions, is disposed at said cigarette package tax stamp application station regardless of the particular height dimension of any one of the plurality of different cigarette cartons having the different height dimensions.

2. The apparatus as set forth in claim 1, further comprising:

a programmable logic controller (PLC) operatively connected to said first means for automatically adjusting the elevational disposition of said tax stamp applicator at said cigarette package tax stamp application station;

a first sensor disposed at a cigarette carton height determination station for detecting the presence of the particular one of the plurality of different cigarette cartons at said cigarette carton height determination station and for transmitting a signal to said programmable logic controller (PLC) indicating the presence of the particular one of the plurality of different cigarette cartons at said cigarette carton height determination station; and a second sensor disposed at said cigarette carton height determination station for determining the height dimension of the particular one of the plurality of different cigarette cartons present at said cigarette carton height determination station and for transmitting the height dimension data characteristic of the particular one of the plurality of different cigarette cartons present at said cigarette carton height determination station to said programmable logic controller (PLC) such that said programmable logic controller (PLC) can control said first means for automatically adjusting the elevational disposition of said tax stamp applicator at said cigarette package tax stamp application station whereby said tax stamp applicator will be properly positioned with respect to the particular one of the plurality of different cigarette cartons when the particular one of the plurality of different cigarette cartons is disposed at said cigarette package tax stamp application station.

3. The apparatus as set forth in claim 2, further comprising:

a cigarette carton opening station interposed between said cigarette carton height determination station and said cigarette package tax stamp application station, and comprising means for opening the particular one of the plurality of cigarette cartons so as to expose the cigarette packages contained within the particular one of the plurality of cigarette cartons in preparation for having tax stamps applied to the cigarette packages by said tax stamp applicator disposed at said cigarette package tax stamp application station; and a cigarette carton closing station disposed downstream of said cigarette package tax stamp application station and comprising means for closing the particular one of the plurality of cigarette cartons after the cigarette packages of the particular one of the plurality of cigarette cartons has had tax stamps applied thereto by said tax stamp applicator disposed at said cigarette package tax stamp application station.

4. The apparatus as set forth in claim 3, wherein:

said means, disposed at said cigarette carton opening station, for opening the particular one of the plurality of cigarette cartons, so as to expose the cigarette packages contained within the particular one of the plurality of cigarette cartons, comprises a pair of doming wheels for engaging side portions of the particular one of the plurality of cigarette cartons and thereby causing upper flap members of the particular one of the plurality of cigarette cartons to be domed upwardly, and a plow member for causing the upper flap members to be unfolded and extended outwardly with respect to each other; and said means, disposed at said cigarette carton closing station, for closing the particular one of the plurality of cigarette cartons, comprises a glue pot and wheel for applying glue to one of the carton flap members, a pair of flap closers for folding the carton flap members in an overlapped mode with respect to each other, and a pressure plate and roller assembly for retaining the carton flap members in a folded state while the glue applied to the one of the carton flap members sets.

5. The apparatus as set forth in claim 4, further comprising:

second means operatively connected to said programmable logic controller (PLC) for automatically adjusting the elevational disposition of said doming wheels and plow member at said cigarette carton opening station in accordance with the height dimension data characteristic of the particular one of the plurality of different cigarette cartons disposed at said cigarette carton height determination station, as the particular one of the plurality of cigarette cartons is conveyed to said cigarette carton opening station by said conveyor such that said doming wheels and plow member are properly positioned with respect to the particular one of the plurality of different cigarette cartons being conveyed to said cigarette carton opening station by said conveyor so as to be capable of opening the particular one of the plurality of different cigarette cartons when the particular one of the plurality of different cigarette cartons is disposed at said cigarette carton opening station regardless of the particular height dimension of the particular one of the plurality of different cigarette cartons; and third means operatively connected to said programmable logic controller (PLC) for automatically adjusting the elevational disposition of said glue pot and wheel, said pair of flap closers, and said pressure plate and roller assembly at said cigarette carton closing station, in accordance with the height dimension data characteristic of the particular one of the plurality of different cigarette cartons disposed at said cigarette carton height determination station, as the particular one of the plurality of cigarette cartons is conveyed to said cigarette carton closing station by said conveyor such that said glue pot and wheel, said pair of flap closers, and said pressure plate and roller assembly are properly positioned with respect to the particular one of the plurality of different cigarette cartons being conveyed to said cigarette carton closing station by said conveyor so as to be capable of closing the particular one of the plurality of different cigarette cartons when the particular one of the plurality of different cigarette cartons is disposed at said cigarette carton closing station regardless of the particular height dimension of the particular one of the plurality of different cigarette cartons.

6. The apparatus as set forth in claim 5, wherein:

said first means for automatically adjusting the elevational disposition of said tax stamp applicator at said cigarette package tax stamp application station, said second means for automatically adjusting the elevational disposition of said doming wheels and plow member at said cigarette carton opening station, and said third means for automatically adjusting the elevational disposition of said glue pot and wheel, said pair of flap closers, and said pressure plate and roller assembly at said cigarette carton closing station, respectively comprise first, second, and third servo drive motors operatively connected to said programmable logic controller (PLC) for respectively receiving the height dimension data characteristic of the particular one of the plurality of different cigarette cartons.

7. The apparatus as set forth in claim 3, wherein:

said cigarette carton height determination station, said cigarette carton opening station, said cigarette package tax stamp application station, and said cigarette carton closing station are all equally spaced apart from each other by a first predetermined distance; and said conveyor for serially conveying the plurality of different cigarette cartons, having different height dimensions, comprises a plurality of pusher members equally spaced apart from each other by a second predetermined distance which is equal to said first predetermined distance comprising the spacing apart of said cigarette carton height determination, said cigarette carton opening, said cigarette package tax stamp application, and said cigarette carton closing stations such that when a first one of said plurality of pusher members has conveyed a first one of the plurality of different cigarette cartons, having different height dimensions, to said cigarette carton closing station, a second one of said plurality of pusher members has conveyed a second one of the plurality of different cigarette cartons, having different height dimensions, to said cigarette package tax stamp application station, a third one of said plurality of pusher members has conveyed a third one of the plurality of different cigarette cartons, having different height dimensions, to said cigarette carton opening station, and a fourth one of said plurality of pusher members is disposed at said cigarette carton height determination station in preparation for conveying a fourth one of the plurality of different cigarette cartons, having different height dimensions, to said cigarette carton opening station.

8. The apparatus as set forth in claim 1, further comprising:

means for holding a roll of tax stamp paper upon which a predetermined row and column array of tax stamps is disposed;

said tax stamp applicator disposed at said cigarette package tax stamp application station comprises a plurality of longitudinally spaced stamping shoes for engaging predeterminedly spaced ones of the tax stamps disposed in the predetermined array of rows and columns upon the roll of tax stamp paper; and said tax stamp applicator is linearly longitudinally movable, with respect to said cigarette package tax stamp application station and in predetermined incremental steps, such that said longitudinally spaced stamping shoes can engage predetermined sets of the predeterminedly spaced tax stamps each time said tax stamp applicator is incrementally moved one step whereby a predetermined number of the plurality of different cigarette cartons can have tax stamps from the rows of tax stamps disposed upon the tax stamp paper applied to their cigarette packages before the tax stamp paper must be advanced so as to present new rows of tax stamps of the row and column array of tax stamps to said stamping shoes of said tax stamp applicator.

9. The apparatus as set forth in claim 1, wherein:

said contact member comprises a horizontally oriented contact plate vertically movable in a reciprocating manner so as to be movable into contact with the upper surface portions of different cigarette cartons having different height dimensions.

10. Apparatus for applying tax stamps onto cigarette packages disposed within different cigarette cartons having different height dimensions, comprising:

conveyor means for serially conveying a plurality of different cigarette cartons having different height dimensions;

a contact member movably disposed at a cigarette carton height determination station for movement into contact engagement with an upper surface portion of a particular one of the plurality of different cigarette cartons, having different height dimensions, disposed at said cigarette carton height determination station;

ultrasonic sensor means, disposed at said cigarette carton height determination station, for sensing the distance of said contact member, disposed in contact with the upper surface portion of the particular one of the plurality of different cigarette cartons having the different height dimensions and disposed at said cigarette carton height determination station, from said sensor means and therefore for determining the particular height dimension of the one of the plurality of different cigarette cartons, having the different height dimensions, disposed at said cigarette carton height determination station, and for generating data indicative of the particular height dimension of the particular one of the plurality of different cigarette cartons, having the different height dimensions, disposed at said cigarette carton height determination station;

tax stamp application means disposed at a cigarette package tax stamp application station for applying tax stamps to individual cigarette packages disposed within each one of the plurality of cigarette cartons, having different height dimensions, as each cigarette carton is disposed at said cigarette package tax stamp application station;

cigarette carton opening means, disposed at a cigarette carton opening station, interposed between said cigarette carton height determination station and said cigarette package tax stamp application station, for opening each one of the plurality of cigarette cartons, having the different height dimensions, so as to expose the cigarette packages contained within each one of the plurality of cigarette cartons, having the different height dimensions, in preparation for having tax stamps applied to the cigarette packages disposed within each opened cigarette carton by said tax stamp application means disposed at said cigarette package tax stamp application station;

cigarette carton closing means, disposed at a cigarette carton closing station disposed downstream of said cigarette package tax stamp application station, for closing each one of the plurality of cigarette cartons, having the different height dimensions, after the cigarette packages of each one of the plurality of cigarette cartons, having the different height dimensions, have had tax stamps applied thereto by said tax stamp application means disposed at said cigarette package tax stamp application station; and means for automatically adjusting the elevational disposition of said cigarette carton opening means disposed at said cigarette carton opening station, for automatically adjusting the elevational disposition of said tax stamp application means disposed at said cigarette package tax stamp application station, and for automatically adjusting the elevational disposition of said cigarette carton closing means disposed at said cigarette carton closing station, in accordance with said height dimension data respectively characteristic of the particular one of the plurality of different cigarette cartons, having the different height dimensions, as determined by said contact member and said sensor means disposed at said cigarette carton height determination station, as each one of the plurality of different cigarette cartons, having the different height dimensions, is respectively disposed at each one of said cigarette carton opening, said cigarette package tax stamp application, and said cigarette carton closing stations, whereby said cigarette carton opening means, said tax stamp application means, and said cigarette carton closing means will be properly positioned with respect to each one of the plurality of different cigarette cartons, having the different height dimensions, when a particular one of the plurality of different cigarette cartons, having the different height dimensions, is being respectively conveyed to each one of said cigarette carton opening, said cigarette package tax stamp application, and said cigarette carton closing stations by said conveyor means such that said cigarette carton opening means, said tax stamp application means, and said cigarette carton closing means can properly engage each one of the plurality of cigarette cartons, having the different height dimensions, as each one of the plurality of cigarette cartons, having the different height dimensions, is respectively disposed at said cigarette carton opening, said cigarette package tax stamp application, and said cigarette carton closing stations, whereby said cigarette carton opening means can properly open each one of the plurality of cigarette cartons, having the different height dimensions, at said cigarette carton opening station, said tax stamp application means can properly apply tax stamps to the cigarette packages disposed within each one of the cigarette cartons, having the different height dimensions, at said cigarette package tax stamp application station, and said cigarette carton closing means can properly close each one of the plurality of cigarette cartons, having the different height dimensions, disposed at said cigarette carton closing station.

11. The apparatus as set forth in claim 10, further comprising:

a programmable logic controller (PLC) operatively connected to said cigarette carton opening means, said tax stamp application means, and said cigarette carton closing means for automatically adjusting the elevational disposition of said cigarette carton opening means, said tax stamp application means, and said cigarette carton closing means at said cigarette carton opening, said cigarette package tax stamp application, and said cigarette carton closing stations;

a first sensor disposed at said cigarette carton height determination station for detecting the presence of each one of the plurality of different cigarette cartons at said cigarette carton height determination station and for transmitting a signal to said programmable logic controller (PLC) indicating the presence of one of the plurality of different cigarette cartons at said cigarette carton height determination station; and a second sensor disposed at said cigarette carton height determination station for determining the height dimension of each one of the plurality of different cigarette cartons present at said cigarette carton height determination station and for transmitting the height dimension data characteristic of each one of the plurality of different cigarette cartons present at said cigarette carton height determination station to said programmable logic controller (PLC) such that said programmable logic controller (PLC) can automatically adjust the elevational disposition of said cigarette carton opening means, said tax stamp application means, and said cigarette carton closing means at said cigarette carton opening, said cigarette package tax stamp application, and said cigarette carton closing stations whereby said cigarette carton opening means, said tax stamp application means, and said cigarette carton closing means will be properly positioned with respect to each one of the plurality of different cigarette cartons, having the different height dimensions, when each one of the plurality of different cigarette cartons, having the different height dimensions, is disposed at said cigarette carton opening, said cigarette package tax stamp application, and said cigarette carton closing stations.

12. The apparatus as set forth in claim 10, wherein:

said cigarette carton opening means, disposed at said cigarette carton opening station, for opening each one of the plurality of cigarette cartons, so as to expose the cigarette packages contained within each one of the plurality of cigarette cartons, comprises a pair of doming wheels for engaging side portions of each one of the plurality of cigarette cartons and thereby cause upper flap members of each one of the plurality of cigarette cartons to be domed upwardly, and a plow member for insertion beneath the domed upper flap members so as to cause the upper flap members of each one of the plurality of cigarette cartons to be unfolded and extended outwardly with respect to each other;

said tax stamp application means disposed at said cigarette package tax stamp application station comprises a stamping iron having a plurality of longitudinally spaced stamping shoes for engaging predeterminedly spaced ones of tax stamps disposed in a predetermined array of rows and columns upon a roll of tax stamp paper; and said cigarette carton closing means, disposed at said cigarette carton closing station, for closing each one of the plurality of cigarette cartons, comprises a glue pot and a glue applicator wheel for applying glue to one of the upper carton flap members, a pair of flap closers for folding the carton flap members from their unfolded and outwardly extended positions to folded positions in an overlapped mode with respect to each other, and a pressure plate and roller assembly for retaining the carton flap members in the folded state while the glue applied to the one of the upper carton flap members sets.

13. The apparatus as set forth in claim 12, wherein:

said means for automatically adjusting the elevational disposition of said doming wheels and said plow member at said cigarette carton opening station, said means for automatically adjusting the elevational disposition of said stamping iron at said cigarette package tax stamp application station, and said means for automatically adjusting the elevational disposition of said glue pot and applicator wheel, said pair of flap closers, and said pressure plate and roller assembly at said cigarette carton closing station, respectively comprise first, second, and third servo drive motors operatively connected to said programmable logic controller (PLC) for respectively receiving the height dimension data characteristic of each one of the plurality of different cigarette cartons.

14. The apparatus as set forth in claim 12, further comprising:

means for holding a roll of tax stamp paper, upon which a predetermined row and column array of tax stamps is disposed, at said cigarette package tax stamp application station; and said stamping iron, having said plurality of longitudinally spaced stamping shoes disposed thereon for engaging the predeterminedly spaced ones of tax stamps disposed within the predetermined array of rows and columns upon the roll of tax stamp paper, is linearly longitudinally movable, with respect to said cigarette package tax stamp application station and in predetermined incremental steps, such that said longitudinally spaced stamping shoes can engage predetermined sets of the predeterminedly spaced tax stamps each time said stamping iron is incrementally moved one step whereby a predetermined number of the plurality of different cigarette cartons can have tax stamps, from the rows of tax stamps disposed upon the tax stamp paper, applied to their cigarette packages before the tax stamp paper must be advanced so as to present new rows of tax stamps of the row and column array of tax stamps to said stamping shoes of said stamping iron.

15. The apparatus as set forth in claim 10, wherein:

said cigarette carton height determination station, said cigarette carton opening station, said cigarette package tax stamp application station, and said cigarette carton closing station are all equally spaced apart from each other by means of a first predetermined distance; and said conveyor for serially conveying the plurality of different cigarette cartons, having different height dimensions, comprises a plurality of pusher members equally spaced apart from each other by means of a second predetermined distance which is equal to said first predetermined distance comprising the spacing apart of said cigarette carton height determination, said cigarette carton opening, said cigarette package tax stamp application, and said cigarette carton closing stations, such that when a first one of said plurality of pusher members has conveyed a first one of the plurality of different cigarette cartons, having different height dimensions, to said cigarette carton closing station, a second one of said plurality of pusher members has conveyed a second one of the plurality of different cigarette cartons, having different height dimensions, to said cigarette package tax stamp application station, a third one of said plurality of pusher members has conveyed a third one of the plurality of different cigarette cartons, having different height dimensions, to said cigarette carton opening station, and a fourth one of said plurality of pusher members is disposed at said cigarette carton height determination station in preparation for conveying a fourth one of the plurality of different cigarette cartons, having different height dimensions, to said cigarette carton opening station.

16. The apparatus as set forth in claim 10, wherein:

said contact member comprises a horizontally oriented contact plate vertically movable in a reciprocating manner so as to be movable into contact with the upper surface portions of different cigarette cartons having different height dimensions.

* * * * *